United States Patent Office 2,733,262
Patented Jan. 31, 1956

2,733,262

N-(2-HYDROXYALKYL) ALKYLENE BISDITHIOCARBAMATES

Edgar C. Britton, Midland, Mich., and Bruce A. Ashby, Schenectady, N. Y., assignors to The Dow Chemical Company, Midland, Mich., a corporation of Delaware No Drawing. Application May 6, 1954,
Serial No. 428,134

5 Claims. (Cl. 260—500)

This invention relates to salts of N-(2-hydroxyalkyl) alkylene bisdithiocarbamic acids and is particularly directed to compounds of the following formula

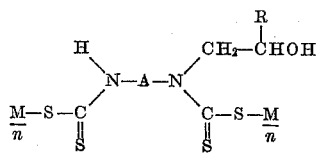

In this and succeeding formulae M represents a metal ion, $n$ is the valency of that ion, A represents an alkylene radical containing 2 or 3 carbon atoms, and R represents hydrogen or a methyl or ethyl radical. These compounds are crystalline solids or viscous liquids which are insoluble in most hydrocarbon solvents and soluble in lower alkyl alcohols and water. They are of value as toxic constituents of agricultural fungicide compositions.

Those of the new compounds which are alkali metal salts may be prepared by reacting carbon disulfide with an aqueous alkali metal hydroxide dispersion, i. e. a suspension or solution, of an N-(2-hydroxyalkyl)alkylene diamine of the formula

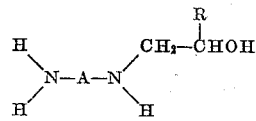

Good results are obtained when employing 2 molecular proportions of carbon disulfide and 2 molecular proportions of the alkali metal hydroxide with each molecular proportion of the diamine reactant. The reaction is somewhat exothermic and takes place readily at temperatures of from about 5° to 46° C. The temperature may be controlled by regulation of the rate of contacting the reactants as well as by external heating or cooling as required.

In a representative operation, one molar proportion of an N-(2-hydroxyalkyl)alkylene diamine and 2 molar proportions of sodium hydroxide are dispersed in water with cooling to prepare an aqueous sodium hydroxide dispersion of the diamine. Two molar proportions of carbon disulfide are then added portionwise to the above mixture with stirring. The addition is carried out at a temperature of from about 5° to 30° C., and the resulting mixture thereafter heated for a period of time at a temperature of from 20° to 46° C. to complete the reaction. In practice it is sometimes convenient to operate at the boiling temperature of the reaction mixture and under reflux. Upon completion of the reaction, the crude reaction product may be distilled under reduced pressure to separate water and to obtain the desired product as a residue. The latter may be further purified, if desired, by crystallization from suitable organic solvents. Alternatively the desired disodium bisdithiocarbamate compounds may be maintained in the form of concentrated aqueous solutions as obtained from the synthesis reaction. In such solution form the products are suitable for use directly as concentrates to provide the active fungicidal agent in agricultural fungicidal sprays.

Other metal bisdithiocarbamates of the invention may be prepared by reacting aqueous solutions of the alkali metal bisdithiocarbamates with water-soluble metal salts such as zinc sulfate, iron chloride, manganese sulfate and magnesium sulfate to prepare aqueous dispersions of the corresponding metal dithiocarbamates. The resulting flocculant precipitates of metal N-(2-hydroxyalkyl)alkylene bisdithiocarbamates may be employed as sprays to control fungi on plants, with or without the addition of wetting or dispersing agents.

The N-(2-hydroxyalkyl)alkylene diamines, employed as starting materials as described above may be prepared by condensing a lower alkylene oxide, such as ethylene, propylene or butylene oxide, with an alkylene diamine such as ethylene diamine or propylene diamine. In carrying out the condensation, the alkylene oxide is added portionwise to an aqueous solution of diamine maintained at a temperature of from about 40° to 45° C. The reaction is somewhat exothermic and takes place readily with the production of the desired products. The temperature may be controlled by regulation of the rate of contacting the reactants as well as by the addition and subtraction of heat, if required. Upon completion of the reaction, the desired product may be separated by fractional distillation at reduced pressure.

The following examples illustrate the invention but are not to be constructed as limiting the same.

Example 1

82.4 grams of 97 percent sodium hydroxide (equivalent to 2 moles of sodium hydroxide) was dissolved in 200 milliliters of water. The resulting solution was cooled and 104.1 grams (1 mole) of N-(2-hydroxyethyl)ethylene diamine (boiling at 243.7° C. at 760 millimeters pressure) added. 152.2 grams (2 moles) of carbon disulfide was then added dropwise with stirring at 5°–10° C. After stirring for one hour the reaction mixture was allowed to warm up to room temperature. An exothermic reaction ensued which brought the mixture to reflux temperature. All the carbon disulfide reacted and the product in aqueous solution in the reaction mixture was orange-red and had a characteristic odor. The product was isolated by removing water by vacuum distillation. The resulting solid was recrystallized twice from absolute ethanol. The product, disodium N-(2-hydroxyethyl)ethylene bisdithiocarbamate, crystallized as the pentahydrate in the form of slightly off-white granular crystals melting at 99°–101° C.

Example 2

49 grams (1.19 mole) of 97 percent sodium hydroxide was dissolved in 573 grams of water and 52 grams (0.5 mole) of N-(2-hydroxyethyl)ethylene diamine was added thereto with stirring. To the resulting mixture 76 grams (1 mole) of carbon disulfide was added portionwise with stirring over a period of about one hour while the reaction mixture was maintained at a temperature of about 25° C. Upon completion of the addition of carbon disulfide the temperature of the reaction mixture was maintained at about 25° C. and stirring was continued for a period of one additional hour to complete the reaction. The resulting bright orange-red solution of the disodium N-(2-hydroxyethyl)ethylene bisdithiocarbamate product was filtered. On analysis for dithiocarbamate content the solution was found to contain 16.4 percent by weight of the desired disodium N-(2-hydroxyethyl)ethylene bisdithiocarbamate.

Example 3

Following the procedure of Example 2, 0.83 mole of sodium hydroxide, 0.347 moles of N-(2-hydroxypropyl)

ethylene diamine and 0.69 mole of carbon disulfide were reacted together in the presence of 418 grams of water to prepare a bright orange-red aqueous solution of disodium N-(2-hydroxypropyl)ethylene bisdithiocarbamate containing 15.7 percent by weight of the desired product by analysis.

Similarly, 1.19 moles of sodium hydroxide, 0.5 mole of N-(2-hydroxyethyl)propylene diamine and one mole of carbon disulfide were reacted together in the presence of 607.5 grams of water to prepare the corresponding disodium N-(2-hydroxyethyl)propylene bisdithiocarbamate as an orange-red aqueous solution containing 15.8 percent by weight of the desired dithiocarbamate by analysis.

*Example 4*

66 grams of 85 percent potassium hydroxide (equivalent to 1 mole of potassium hydroxide) and 52 grams (0.5 mole) of N-(2-hydroxyethyl)ethylene diamine were mixed with 300 milliliters of water and the mixture cooled to 20° C. To this mixture 76 grams (1 mole) of carbon disulfide was added rapidly with stirring. Stirring was continued and the reaction mixture was heated gradually over a period of 20 minutes to a temperature of 40°–45° C., the latter temperature being maintained for a period of 45 minutes. The reaction mixture was then cooled to 25° C., made alkaline with potassium hydroxide and diluted with water to give a total of 830 grams of solution. The latter was filtered to obtain an orange-red solution containing 20 percent by weight of dipotassium N-(2-hydroxyethyl)ethylene bisdithiocarbamate.

*Example 5*

Employing the method of Example 4, 0.5 mole of N-(2-hydroxybutyl)ethylene diamine, 1 mole of potassium hydroxide and 1 mole of carbon disulfide are reacted together in the presence of water. The reaction product is filtered and diluted with water to a total 865 grams to obtain an aqueous composition containing 20 percent by weight of dipotassium N-(2-hydroxybutyl)ethylene bisdithiocarbamate.

The N-(2-hydroxyalkyl)alkylene bisdithiocarbamates as prepared in aqueous solution form in Examples 2 and 3 are suitable to be employed directly as agricultural fungicide concentrates. For example, the solution of the disodium N-(2-hydroxypropyl)ethylene bisdithiocarbamate of Example 3 is diluted with water to obtain a spray composition containing 3 quarts of the aqueous concentrate of Example 3 per hundred gallons of finished spray. The resulting spray composition is applied to young actively-growing tomato plants of the Bonnie Best variety and allowed to dry. The treated plants and similar untreated plants are then sprayed with an active suspension of the spores of tomato early blight (*Alternaria solani*) and the plants thereafter maintained for a period of several days under warm moist conditions. The plants are then removed to a greenhouse for a period of about 10 days, after which observations of the treated and untreated plants are made to determine the extent of infestation with early blight. It is found that the untreated plants are heavily infested with lesions of the early blight fungus whereas the plants treated with disodium N-(2-hydroxypropyl)ethylene bisdithiocarbamate are substantially free of early blight lesions.

We claim:

1. N-(2-hydroxyalkyl)alkylene bisdithiocarbamates of the formula

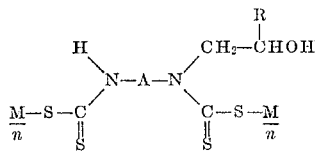

wherein M represents a metal ion, $n$ is the valency of said ion, A represents an alkylene radical containing 2 to 3 carbon atoms, inclusive, and R represents a member of the group consisting of hydrogen and alkyl radicals containing from 1 to 2 carbon atoms, inclusive.

2. Disodium N-(2-hydroxyethyl)ethylene bisdithiocarbamate.

3. Disodium N-(2-hydroxypropyl)ethylene bisdithiocarbamate.

4. Disodium N-(2-hydroxyethyl)propylene bisdithiocarbamate.

5. Dipotassium N-(2-hydroxyethyl)ethylene bisdithiocarbamate.

References Cited in the file of this patent

UNITED STATES PATENTS

| | | |
|---|---|---|
| 1,972,961 | Tisdale et al. | Sept. 11, 1934 |
| 2,317,765 | Hester | Apr. 27, 1943 |